ANNEALING FURNACE SEAL

Original Filed Nov. 2, 1967 2 Sheets-Sheet 1

INVENTOR.
FRED L. KITCHEL
By Donald H. Dalton
Attorney

ANNEALING FURNACE SEAL

Original Filed Nov. 2, 1967 2 Sheets-Sheet 2

INVENTOR.
FRED L. KITCHEL
By Donald G. Dalton
Attorney

United States Patent Office

Re. 27,543
Reissued Jan. 9, 1973

27,543
ANNEALING FURNACE SEAL

Fred L. Kitchel, Portage Township, County of Porter, Ind., assignor to United States Steel Corporation Original No. 3,471,137, dated Oct. 7, 1969, Ser. No. 680,056, Nov. 2, 1967. Application for reissue Sept. 23, 1971, Ser. No. 183,220
Int. Cl. F27b *5/00*
U.S. Cl. 263—40 8 Claims

Matter enclosed in heavy brackets [ ] appears in the original patent but forms no part of this reissue specification; matter printed in italics indicates the additions made by reissue.

ABSTRACT OF THE DISCLOSURE

A seal for eliminating or reducing air infiltration into an inner cover of a steel annealing furnace including a tube of woven metal reinforced ceramic strand filled with ceramic fibers in bulk form on which the bottom of the inner cover rests.

This invention relates to a seal and more particularly to a seal for preventing infiltration of air into the inner cover of a batch type annealing furnace. Such furnaces, sometimes called bell annealing furnaces, include a base upon which coils of steel strip are stacked with a removable inner cover on the base. One or more such bases are arranged beneath a removable outer cover carrying heating means thereon. An annealing atmosphere is circulated by means of a fan within each inner cover and it is necessary to provide a seal to prevent infiltration of air into the inner cover and escape of atmosphere from the inner cover. A sand seal is most commonly used for this purpose. This includes a channel for the sand in which the inner cover rests. Such a seal is shown in Dailey Patent No. 2,489,012 dated Nov. 22, 1949. Sand seals have various disadvantages, the most important one being that a portion of the sand sometimes contacts the strip being annealed and causes sand pits which results in a loss of production. It also requires about an hour of a workman's time to prepare the sand seal for each use. Liquid seals have also been used to some extent, but these two have disadvantages. Due to the heat the liquid may vaporize and contaminate the seal strip. There are also problems in handling the liquid. It has also been proposed to use a refractory seal of alumina silicate as shown in Cone Patent No. 2,854,226 dated Sept. 30, 1958. However, as disclosed therein this seal has various disadvantages. It requires the use of two seals, one a metal-to-metal seal for supporting the majority of the weight of the inner cover, this being necessary to prevent injury to the sealing medium by shearing or permanent deformation. There is also a tendency for the material to stick to the inner cover.

It is therefore an object of my invention to provide a seal which will eliminate or greatly decrease the quality loss of the material being heat treated.

Another object is to provide such a seal which can be readily handled and which need not be prepared for each use.

Still another object is to provide a refractory seal that can support the full weight of the inner cover.

These and other objects will be more apparent after referring to the following specification and attached drawings, in which.

Figure 2:
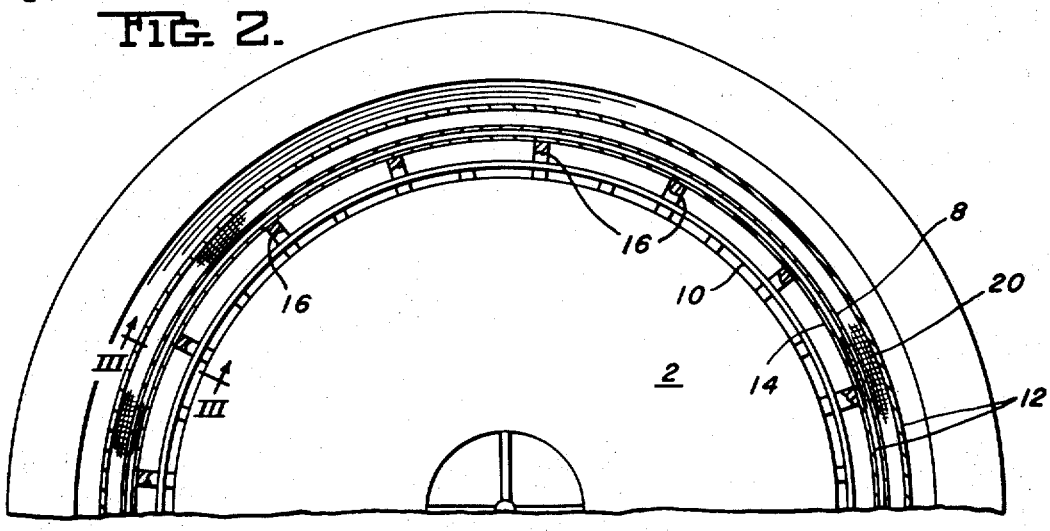
FIGURE 2 is a view taken on line II—II of FIGURE 1, but showing only one half of the furnace.
Figure 1:
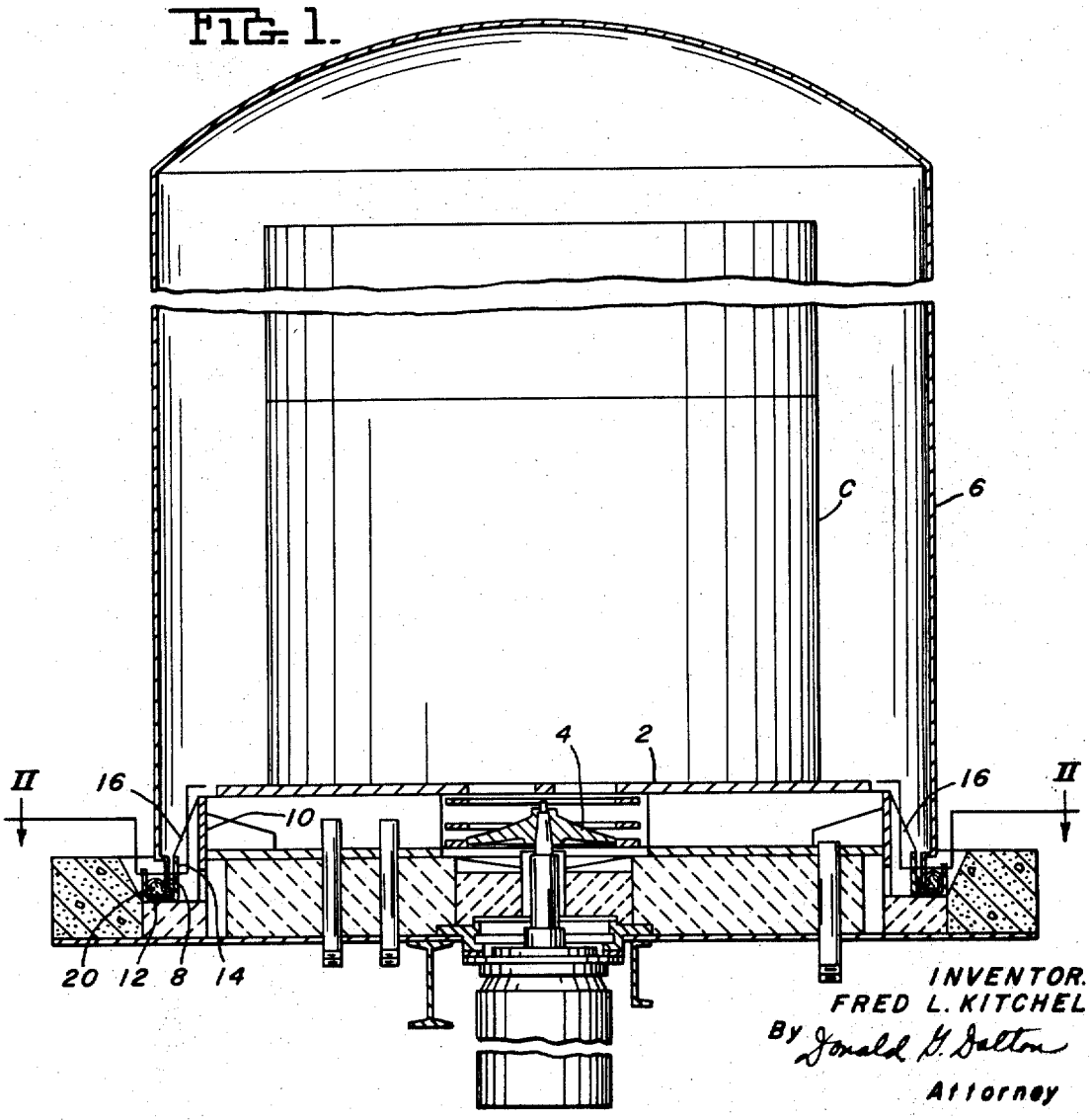
FIGURE 1 is a sectional view of an inner annealing cover and supporting structure with my seal incorporated therein.
Figure 3:
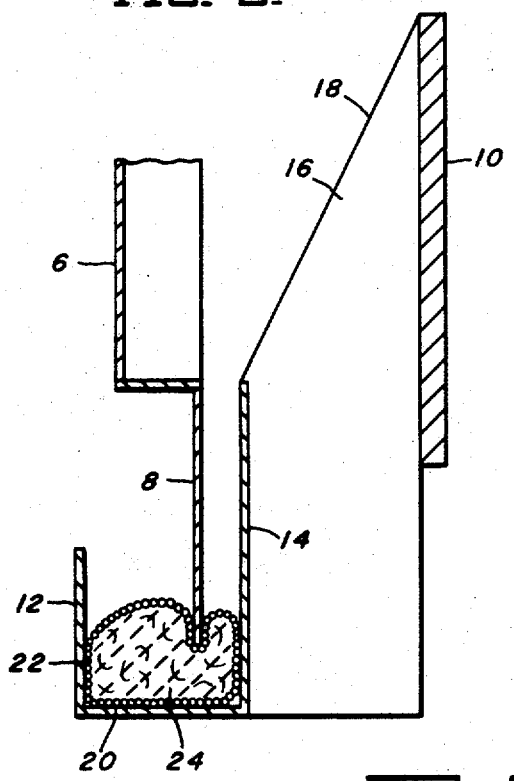
FIGURE 3 is an enlarged view taken on line III—III of FIGURE 2.
Figure 4:
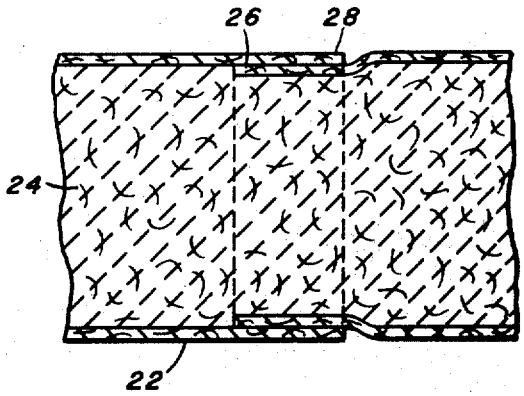
FIGURE 4 is an enlarged view of the connection between the ends of the seal member.

Referring more particularly to the drawings, reference numeral 2 indicates the base of an annealing furnace for supporting a coil C of steel strip. A fan 4 is used to circulate atmosphere through and around the coil C beneath a corrugated inner cover 6 which is preferably made of stainless steel. A vertical skirt 8 is provided at the lower end of the cover 6. The base 2 includes a circumferential vertical steel plate 10. According to any invention, I provide a trough 12 which surrounds the circular base 2 below the top thereof. Inner leg 14 of the trough extends upwardly parallel to the plate 10 and a plurality of gusset plates 16 extend between and are welded to the plates 10 and 14 in spaced apart relationship. The top of the gusset plates 16 taper downwardly and outwardly to form guides 18 for the cover 16. Sealing member 20 of my invention consists of a flexible woven textile tube 22 filled with bulk fiber 24. The member 20 extends around the complete periphery of trough 12 and has its ends joined in any suitable manner. For example, the tube 22 may have one end 26 tucked within the other end 28 as shown in FIGURE 4. The tube 22 consists of ceramic strands reinforced with any metal resistant to oxidation at high temperatures. Various fibrous ceramic materials such as asbestos, glass fiber and mineral wool that can be spun and woven into a heat resistant cloth are suitable as long as the ceramic material possesses a high softening point and good resilience. Similar ceramic material can be used in the unspun or bulk condition for the filling 24. One suitable material used for this purpose has a composition of 51.3% $Al_2O_3$, 45.3% $SiO_2$, and 3.4% $ZrO_2$ and is sold under the trade name Fiberfrax by the Carborundum Company. Cords of this material impregnated with Nichrome wire reinforcement are woven into cloth for this purpose. Similarly the fibrous filling 24 may have a composition of 50.9% $Al_2O_3$, 46.8% $SiO_2$, 1.2% $B_2O_3$, .8% $Na_2O$ and .3% to .5% miscellaneous inorganic material. This material can withstand temperatures up to 2300° F. The member 20 should essentially fill the trough 12. The diameter of the tube 22 is preferably equal to the width W of the trough 12 although the width W could be as much as ¼ inch greater or ½ inch less than the diameter of the tube and sitll function properly.

Figure 5:
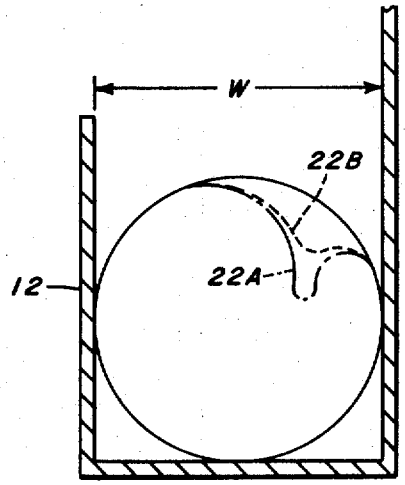
FIGURE 5 is an enlarged view of a portion of FIGURE 3 showing the shape of the seal member at various stages in its use.

In operation, the member 20 is placed in the trough 12 and will assume substantially circular form as shown in full lines in FIGURE 5. After the charge is placed on the base 2, the inner cover 6 is lowered into the trough 12 with the guides 18 positioning the inner cover 6 in the desired position on the member 20. The diameter of leg 8 of the inner cover is generally equal to the diameter of trough 12 at the center thereof, but may vary therefrom. The variation preferably should not exeed 2 inches. When the leg 8 of the inner cover 6 is lowered onto the member 20 it will depress the upper part of it approximately to the broken line position 22A shown in FIGURE 5. When the inner cover is removed the member 20 will expand somewhat upwardly to approximately the dash-dot line 22B shown in FIGURE 5. When the inner cover 6 is lowered a second and subsequent time the guides 18 will return the inner cover to relatively the same position so that a better seal and longer life is provided. I have found that the member 20 has sufficient strength to support the full weight of the inner cover, that it has sufficient resiliency to provide a very good seal and that it will not contaminate the charge.

While one embodiment of my invention has been hown and described, it will be apparent that other adap- ations and modifications may be made.

I claim:

1. In a furnace having a base, a peripheral trough sur- ounding said base, said trough having inner and outer ides, and a cover adapted to surround said base with its ower end in said trough, the improvement comprising a exible woven tube made of ceramic strands reinforced ith metal resistant to oxidation at high temperatures, nd bulk ceramic filler in said tube, the length and cross ection of said filled tube being such as to extend com- letely around the periphery of the trough in bearing en- agement with the sides of the trough.

2. The combination of claim 1 in which the trough has enerally concentric inner and outer legs, the outside di- meter of said tube being approximately equal to the dis- ance between said inner and outer legs.

3. The combination of claim 1 including guides for said over around the periphery of said base extending down- vardly and outwardly from a point adjacent the top of aid base to the inner side of said trough.

4. The combination of claim 3 in which the trough has enerally concentric inner and outer legs, the outside di- meter of said tube being approximately equal to the dis- ance between said inner and outer legs.

*5. In a furnace having a base, a peripheral trough urrounding said base, said trough having inner and outer ides, and a cover adapted to surround said base with its ower end in said trough, the improvement comprising a lexible resilient sealing member having sufficient strength o support the full weight of said inner cover, said sealing nember including a flexible tube made of high heat re- istant material, and filler material in said tube made of high heat resistant material, the length and cross section of said sealing member being such as to extend completely around the periphery of the trough in bearing engagement with the sides of the trough.*

*6. The combination of claim 5 in which the trough has generally concentric inner and outer legs, the outside diameter of said tube being approximately equal to the distance between said inner and outer legs.*

*7. The combination of claim 5 including guides for said cover around the periphery of said base extending downwardly and outwardly from a point adjacent the top of said base to the inner side of said trough.*

*8. The combination of claim 7 in which the trough has generally concentric inner and outer legs, the outside diameter of said tube being approximately equal to the distance between said inner and outer legs.*

References Cited

The following references, cited by the Examiner, are of record in the patented file of this patent or the original patent.

UNITED STATES PATENTS

| | | | |
|---|---|---|---|
| 1,892,112 | 12/1932 | Moore et al. | 263—41 X |
| 2,849,220 | 8/1958 | Duffy et al. | 263—42 TH |
| 2,964,307 | 12/1960 | Van Dine | 263—40 |
| 3,179,394 | 4/1965 | Sims et al. | 266—5 B |
| 3,411,763 | 11/1968 | Blackman et al. | 34—242 X |

JOHN J. CAMBY, Primary Examiner

U.S. Cl. X.R.

34—242; 266—5 B